United States Patent [19]
Judge et al.

[11] Patent Number: 5,216,350
[45] Date of Patent: Jun. 1, 1993

[54] METHOD AND SYSTEM FOR CONTROLLING AN ALTERNATOR

[75] Inventors: Alan F. Judge, Farmington Hills; Michael E. Schmenk, Novi, both of Mich.

[73] Assignee: Ford Motor Company, Dearborn, Mich.

[21] Appl. No.: 712,798

[22] Filed: Jun. 10, 1991

[51] Int. Cl.⁵ .................. H02P 9/10; H02H 7/085
[52] U.S. Cl. ................................................ 322/25
[58] Field of Search ............... 322/25, 14, 28, 24, 322/99, 59, 64; 320/72; 307/86, 87

[56] References Cited

U.S. PATENT DOCUMENTS

| | | | |
|---|---|---|---|
| 3,373,333 | 3/1968 | Eckard | 320/32 |
| 3,544,881 | 12/1970 | Raver et al. | 322/27 |
| 4,308,492 | 12/1981 | Mori et al. | 320/32 |
| 4,459,489 | 7/1984 | Kirk et al. | 290/13 |
| 4,543,521 | 9/1985 | Morishita et al. | 320/64 |
| 4,629,968 | 12/1986 | Butts et al. | 322/29 |
| 4,659,977 | 4/1987 | Kissel et al. | 320/64 |
| 4,661,760 | 4/1987 | Goto et al. | 322/27 |
| 5,006,781 | 4/1991 | Schultz et al. | 322/25 |

OTHER PUBLICATIONS

Gorski et al., "Digital and Adaptive Control of Synchronous Machine Excitation and Speed," *Canadian Communications and Power Conference*, Oct. 1978.

*Primary Examiner*—Steven L. Stephan
*Assistant Examiner*—E. To
*Attorney, Agent, or Firm*—Roger L. May; Allan J. Lippa

[57] ABSTRACT

A method and system for controlling an alternator in a power supply system for a vehicle utilizing a digital current control or compensation algorithm. The alternator has field windings and provides an output current as a function of field voltage across the field windings. The alternator is controlled by a microprocessor-based voltage regulator programmed with the algorithm in response to a reference control signal and a load demand signal based on the current demand of the electric load. Desired responses of the alternator to corresponding current demands are defined by a data matrix of system operating coefficients. A set of the coefficients is selected based on the load demand signal and the set is used with the algorithm to calculate a desired field voltage so that the output current is responsive to variations in system load demand.

17 Claims, 3 Drawing Sheets

METHOD AND SYSTEM FOR CONTROLLING AN ALTERNATOR

TECHNICAL FIELD

The present invention is related to a method and apparatus for controlling the alternator in an automotive power supply system, and, in particular, to a method and apparatus for digitally controlling the alternator in response to variations in the current demand of an electric load.

BACKGROUND ART

Conventional automotive power supply systems include a voltage regulator, an engine-driven alternator and a battery. The voltage regulator serves to maintain the output voltage of the alternator in accordance with the voltage requirements of the battery by controlling the current flow through the field windings of the alternator.

One problem associated with conventional system power supply systems results from large system load current variations. Such variations might occur when the vehicle's climate control system is activated. This increased electrical load quickly reduces the output voltage of the alternator, causing the voltage regulator to increase the field current applied to the alternator. This increase in field current suddenly loads the alternator, which in turn increases the load on the engine and the vehicle speed slows dramatically.

If a speed control system is being operated concurrently, the speed control system increases engine speed. Typically, the air conditioning clutch is then deenergized to allow for increased engine performance until the preset vehicle speed is attained. When the preset speed is attained, the air conditioning clutch is again energized, and the cycle repeats. It is desirable, therefore, to prevent this condition by controlling the alternator response to system load current variations.

U.S. Pat. No. 3,373,333, issued to Eckard, discloses a voltage and current regulator for an automotive electrical system. The system is capable of keeping the battery charged to a desired extent and supplying sufficient current to operate several electrical current consuming mechanisms without the possibility of overcharging the battery.

U.S. Pat. No. 3,544,881, issued to Raver et al., discloses a transistor voltage and current regulating system for an alternating current generator. The system controls the generator voltage in accordance with changes in generator load current utilizing an output transistor which is controlled by a first driver transistor responsive to voltage and a second driver transistor responsive to current developed by the generator.

U.S. Pat. No. 4,308,492, issued to Mori et al., discloses a method of charging a vehicle battery utilizing an electronically controlled data processing device, such as a microcomputer. The method controls battery charging conditions in accordance with temperature, battery electrolyte, external electric loads and battery voltage, so as to prevent voltage drop due to overloading and to insure stable battery charging.

U.S. Pat. No. 4,459,489, issued to Kirk et al., discloses a generator load response control. The load response control prevents the imposition of a sharply increased torque load on the engine when an electrical is applied to the generator. The load control detects a sudden drop in generator output voltage and gradually increases the field current from a level substantially equal to the field current that existed just prior to the detected voltage drop.

U.S. Pat. No. 4,543,521, issued to Morishita et al., discloses a c control microcomputer device for a vehicle. The microcomputer determines the most suitable reference voltage for the charging system voltage regulator based on various input data from the charging system and an engine control microcomputer. The device is also useful for preventing the overcharging or over-discharging of the battery through a fault detection mechanism.

U.S. Pat. No. 4,629,968, issued to Butts et al., discloses a load control system for controlling a field current of an alternating current generator and the idle speed control system for the engine that drives the generator. The system operates such that when a large electrical load is applied to the generator, the system senses a drop in generator output voltage and then maintains the idle speed control system of the engine in such a manner as to increase the fuel-air mixture supplied to the engine in anticipation of the fact that field current will be increased due to the application of the electrical load.

U.S. Pat. No. 4,659,977, issued to Kissel et al., discloses a microcomputer controlled electronic alternator for vehicles. The microcomputer utilizes a battery temperature signal to calculate a desired set point voltage based on inverse first-order relationship between battery temperature and desired battery voltage. Current is supplied to the alternator field windings in accordance with a between the desired set point voltage and the battery voltage signal in response to a control signal from the microcomputer. The microcomputer is also provided with additional feedback information relating to various driving conditions such as throttle position and engine RPM.

U.S. Pat. No. 4,661,760, issued to Goto et al., discloses a control system for an engine-driven generator. The control system detects the current supplied to the electrical load and alters the generator output voltage level through field regulation in accordance with the detected current. The system is also capable of switching the generator output voltage level according to the state of the load applied, thereby improving power generation efficiency.

Conventional control systems having fixed hardware are unable to provide an adequate control of the alternator response to variations in current demand.

DISCLOSURE OF INVENTION

It is an object of the present invention to provide a method and system for controlling the response of an alternator in a vehicle power supply system based on system load current variations.

It is another object of the present invention to provide a method and system for controlling the response of an alternator utilizing a digital current control algorithm.

It is a further object of the present invention to provide a method and system for controlling the response of an alternator utilizing a set of coefficients based on a particular load demand condition, the set being selected from a data matrix of coefficients defining desired alternator responses to corresponding current demands.

It is an additional object of the present invention to provide a method and system for controlling the response of an alternator utilizing a set of coefficients which may be modified based on the angular velocity of the alternator.

In carrying out the above objects and other objects of the present invention, a method is provided for controlling an engine-driven alternator in a power supply system for a vehicle in which a battery and an electric load are electrically connected in parallel with the alternator. The alternator has field windings and provides an output current which is a function of the voltage across the field windings. The alternator is controlled in response to a reference control signal and a load demand signal based on the current demand of the electric load, wherein desired responses of the alternator to corresponding current demands are defined by a data matrix of system operating coefficients. The method comprises the steps of generating an output signal based on the actual current and/or voltage output of the alternator and generating an error signal based on the difference between the reference control signal and said output signal. The method also includes the steps of correlating the load demand signal with the data matrix to obtain set of the coefficients, having values based on the desired response time of the alternator as a function of the load demand signal and calculating a desired field voltage based on said set of coefficients and said error signal. The coefficients can be modified based on the angular velocity of the alternator. Finally, the method includes the step of energizing the field windings of the alternator based the desired field voltage, thereby controlling the alternator based on system load current variations.

In addition, a system is provided for carrying out the above method.

The advantages accruing to the method and system of the present invention are numerous. For example, the digital current control algorithm and data matrix of system operating coefficients provide for precise control of the alternator response to variations in the load demand.

The above objects and other objects and features of the invention will be readily appreciated by one of ordinary skill in the art from the following detailed description of the best mode for carrying out the invention when taken in connection with the following drawings.

BEST MODE FOR CARRYING OUT THE INVENTION

Figure 1:
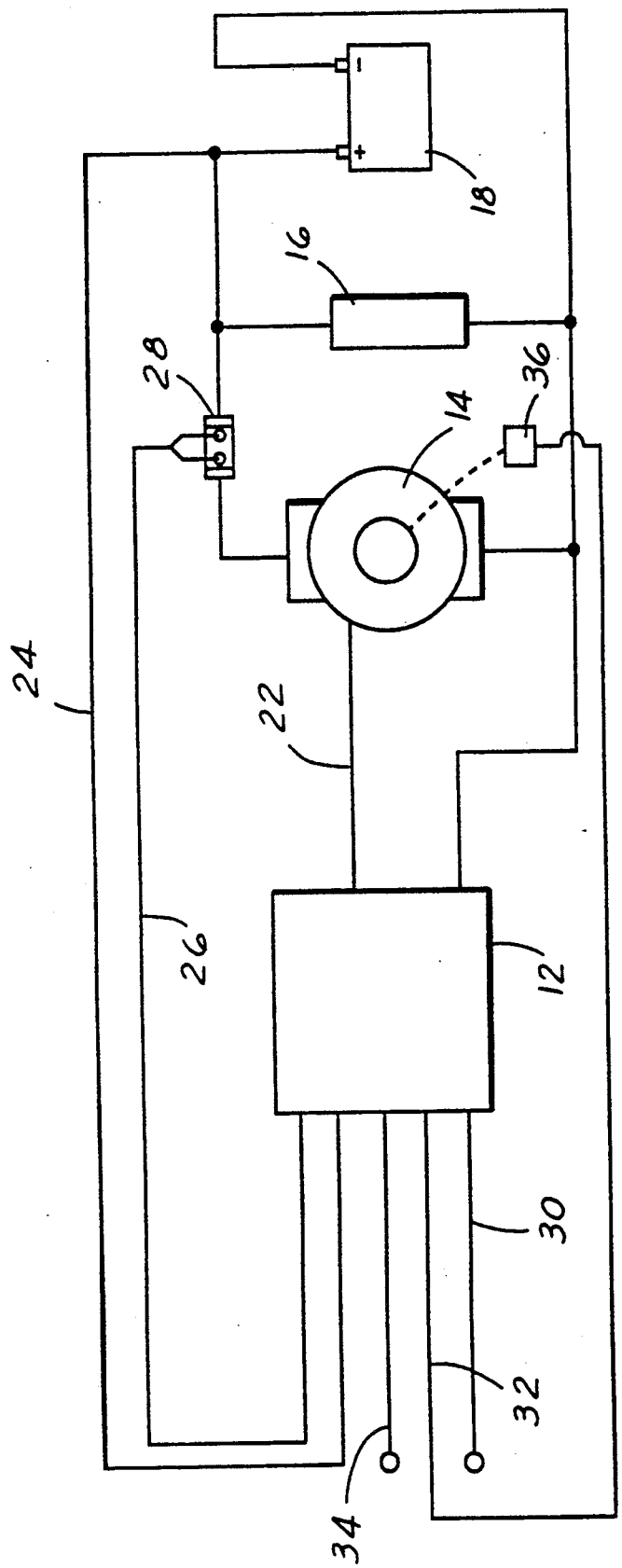
FIG. 1 is a block diagram of a power supply system for a vehicle including an alternator which is controlled by the method and system of the present invention.

Referring now to FIG. 1, there is illustrated a power supply system for a vehicle shown generally by reference numeral 10. The system 10 includes a voltage regulator 12, an engine-driven alternator 14 and a battery 18 for supplying power to a system load 16.

The alternator 14 is a conventional engine-driven, alternating current (AC) alternator. The alternator 14 has field windings, output windings and an internal rectifier (not shown).

The system load 16 and the battery 18 are electrically connected in parallel with the alternator 14. The system load 16 includes various types of power-operated, current-consuming devices present on vehicles such as headlights, motors and the like.

The voltage regulator 12 is preferably a microprocessor-based regulator adapted to control the alternator 14. Control is achieved utilizing various analog and/or digital input signals and a digital current control algorithm, as will be discussed in detail herein below. The regulator 12 has internal analog-to-digital (A/D) and digital-to-analog (D/A) converters and a read/write memory, not specifically illustrated. It should be appreciated that control of alternator 14 could be achieved utilizing other discrete digital hardware, including pulse-width modulation (PWM) circuitry.

System voltage is preferably provided to the voltage regulator 12 as an analog feedback signal via voltage sensor or voltage sense line 24, which electrically connects the regulator 12 and the battery 18.

Current sensor 28 is electrically connected in series with the output of alternator 14 and the sensor provides an analog feedback signal based on the output current of the alternator 14 via current sense line 26 to the voltage regulator 12.

In addition to voltage and current feedback, the regulator 12 receives load demand data from the vehicle master microprocessor (not specifically illustrated). Load demand data is provided to the regulator 12 as a digital signal via load demand line 30.

As is known, the master microprocessor governs most aspects of vehicle and engine operation and is involved in the control of many mechanisms which introduce variations in the current demand of the system load 16 when activated. For example, the master microprocessor typically controls the operation of the air conditioning clutch of the climate control system to maintain vehicle interior temperature. When the clutch is energized, there is a sharp increase in current demand from the system load 16. Since the master microprocessor "knows" when the clutch will be energized, it can help control the alternator response to this impending variation and prevent the alternator 14 from becoming suddenly loaded, as described in greater detail herein below.

The regulator 12 also receives and processes an ignition input signal via ignition line 34. The ignition input signal provides the regulator 12 with data regarding vehicle operation so that regulation of the alternator can begin. Alternator speed sensor 36 provides an input velocity signal relating to the angular velocity (RPM) of the alternator 14 to the regulator 12.

Figure 2:
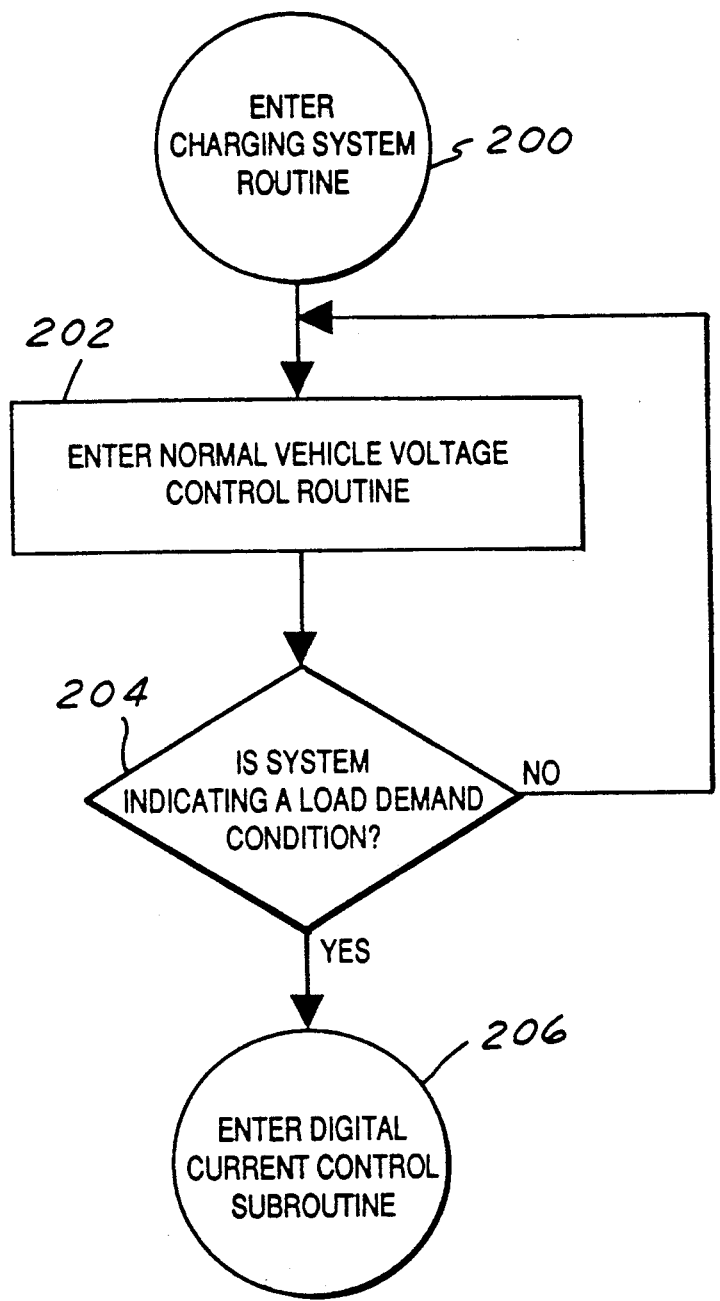
FIG. 2 is a flowchart illustrating a charging system routine of the method and system of the present invention.

Referring now to FIG. 2, during vehicle operation, the regulator 12 begins controlling the alternator 14 at step 200 by entering the charging system routine. When a load demand condition (e.g. when the air conditioning clutch is energized) is not present, the regulator 12 utilizes voltage and/or current feedback to control the alternator 14 according to a normal vehicle voltage control routine at step 202. Such control is generally known to consist of controlling the output voltage of the alternator 14 in accordance with the voltage requirement of the battery 18 by controlling the current flow through the field windings, and, as such, will not be explained in greater detail for purposes of the present invention.

Figure 3:
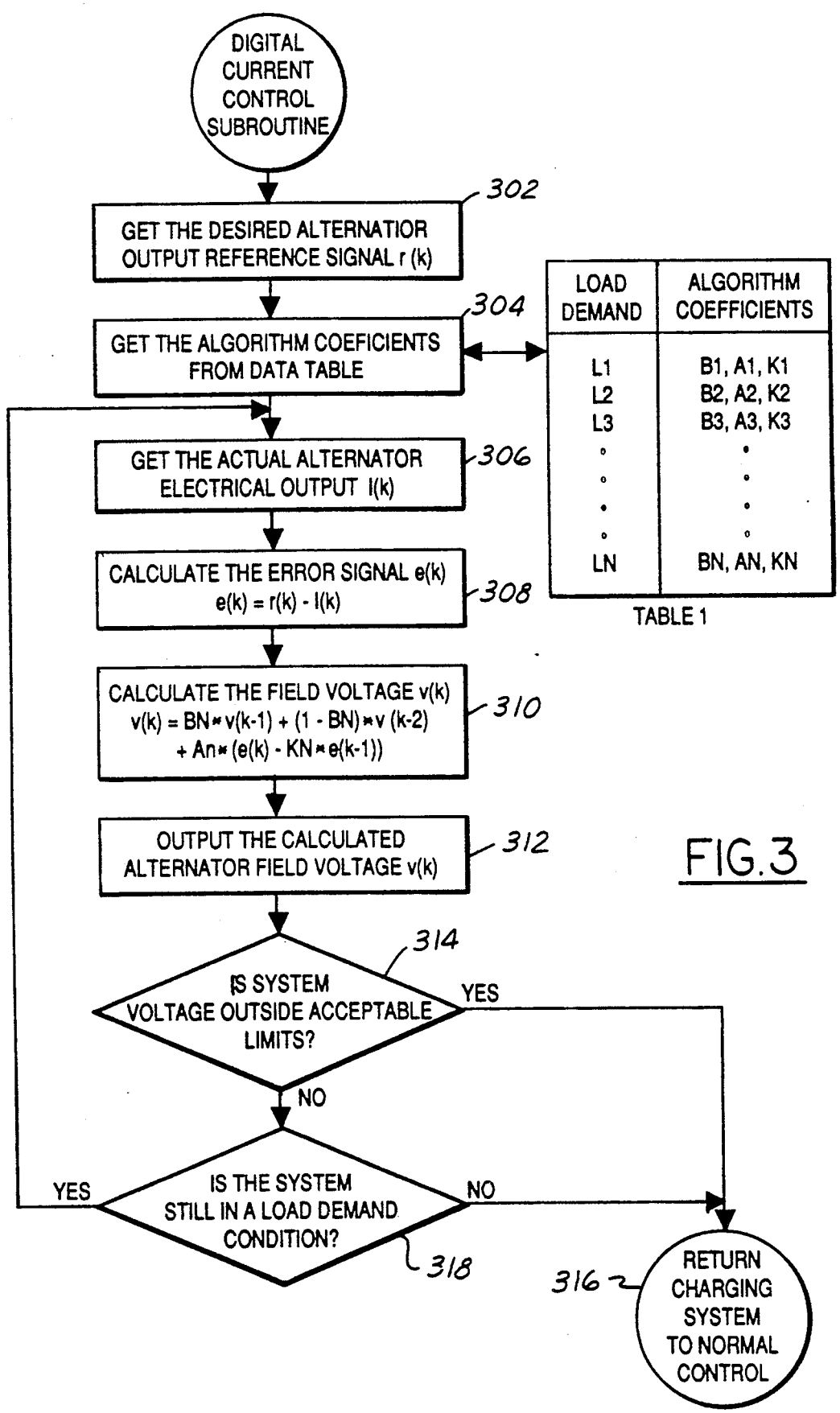
FIG. 3 is a flowchart illustrating a digital current control subroutine of the method and system of the present invention.

When a load demand condition is present, the master microprocessor produces the appropriate signal on the load demand line 30. At step 204, the regulator 12 checks for the presence of the signal on the load demand line 30. If the signal is present, the regulator 12 enters the digital current control subroutine at step 206, the flow diagram of which is shown in FIG. 3.

The digital current control subroutine utilizes the digital current control or compensation algorithm to control the alternator 14 during the load demand condition. The algorithm, described in greater detail herein below, is a second-order discrete difference equation having modifiable coefficients and is used to calculate a desired field voltage. As is known, the coefficients determine the characteristic of the equation and therefore ultimately determine the alternator response time.

Each load demand condition has a corresponding alternator response that satisfies the demand in a desired fashion. Desired responses of the alternator to corresponding load demand conditions are defined by a data matrix of system operating coefficients stored in a data table 36 in a read/write memory of regulator 12, thereby allowing precise control of the alternator 14 for a given load demand. Conventional control systems having fixed hardware are unable to control the alternator 14 in response to variations in current demand with the precision afforded by the digital current control of the present invention.

Since alternator output voltage is not a linear function of alternator RPM, the regulator 12 requires RPM data to maintain alternator response at various speed. This is accomplished by modification of the system operating coefficients based on alternator RPM.

When the regulator 12 enters the digital current control subroutine, a reference control signal is generated at step 302 by the regulator 12. The reference control signal, labelled r(k) in FIG. 3, is based on vehicle operating conditions (e.g. temperature) and represents the desired alternator output voltage.

At step 304, a set of coefficients is retrieved from the data table 36 as a function of the load demand signal which is correlated with the data matrix of the data table 36. The regulator 12 then reads the actual alternator output from the current sense line 26 at step 306. It should be appreciated that a voltage feedback signal from voltage sense line 24 could also be utilized. The analog feedback signals are then internally converted to corresponding digital values.

At step 308, the regulator 12 computes an error signal. The error signal, labelled e(k) in FIG. 3, represents the difference between the desired alternator output current r(k) and the actual alternator output current 1(k) and can be expressed mathematically as follows:

$$e(k) = r(k) - 1(k)$$

Having selected the coefficients for the load demand condition and calculated the error signal, the regulator 12 calculates the desired field voltage v(k) utilizing the following second-order discrete difference equation:

$$v(k) = BN * v(k-1) + (1-BN) * v(k-2) + AN * [e(k) - KN * e(k-1)]$$

where AN, BN and KN are the selected set of coefficients determined at step 304. V(k−1), v(k−2) and e(k−1) represent previously calculated values for the field voltage and the error signal, respectively.

The field voltage is calculated as a digital value and is internally converted to a corresponding analog value. In addition, the regulator 12 has an internal voltage-to-current converter. Thus, the calculated desired field voltage is transformed to a desired field current. However, it should be appreciated that the field voltage could be output as a PWM signal.

At step 312, the field current is applied to the field windings of the alternator 14 via the field line 22, thereby modifying the alternator output.

At step 314, the regulator 12 reads the voltage sense line 24 to determine if the system voltage, as modified, has reached a predefined acceptable limit. The charging voltage limits are preferably a function of temperature and engine speed and are established so as to prevent overcharging or undercharging of the battery. If the voltage has reached a limit, control is returned to the normal vehicle voltage control routine, as described in greater detail above at step 202.

If the system voltage has not reached the limit, the regulator 12 reads the load demand line 30 to determine if the load demand condition is still present. If the load demand condition is no longer present, the modified alternator output satisfied the current demand and control is returned to the normal vehicle voltage control routine, as described in greater detail above at step 202. If, however, a load demand condition still exists, steps 306 through 318 are repeated as described above until the load demand condition is satisfied.

It is to be appreciated that in addition to allowing different overall closed-loop alternator responses based on load demand condition and alternator RPM, the present invention could be utilized in the analysis of power characteristics during the research and development of future alternators. Additionally, the present invention could find use in tuning the current response of a voltage regulator to a particular type of alternator.

It is understood, of course, that while the form of the invention herein shown and described constitutes the preferred embodiment of the invention, it is not intended to illustrate all possible forms thereof.

It will also be understood that the words used are words of description rather than limitation, and that various changes may be made without departing from the spirit and scope of the invention as disclosed.

What is claimed is:

1. In a power supply system for a vehicle in which a battery and an electric load are electrically connected in parallel with an engine-driven alternator having field windings, the alternator providing an electrical output which is a function of the voltage across the field windings, a method of controlling the alternator in response to a reference control signal and a load demand signal based on the current demand of the electric load, wherein desired responses of the alternator to corresponding current demands are defined by a data matrix of system operating coefficients, the method comprising the steps of:

generating an output signal based on the electrical output of the alternator;

generating an error signal based on the difference between the reference control signal and said output signal;

correlating the load demand signal with the data matrix to obtain a set of the coefficients as a function of the load demand signal, the coefficients having values based on the desired responses of the alternator;

calculating a desired field voltage based on said set of coefficients and said error signal; and energizing the field windings of the alternator based on the desired field voltage, thereby controlling the alternator based on system load current variations.

2. The method of claim 1 further comprising the steps of:

generating a velocity signal based on an angular velocity of the alternator; and modifying said set of coefficients based on said velocity signal.

3. The method of claim 1 further comprising the step of generating at least one feedback signal based on an electrical characteristic of the electrical output of the alternator.

4. The method of claim 3 wherein the step of generating at least one feedback signal includes the step of sensing the current associated with the electrical output of the alternator.

5. The method of claim 3 wherein the step of generating at least one feedback signal includes the step of sensing the voltage associated with the electrical output of the alternator.

6. The method of claim 4 further comprising the step of generating a second feedback signal which includes the step of sensing the voltage associated with the electrical output of the alternator.

7. The method of claim 1 wherein the desired field voltage is calculated utilizing a difference equation.

8. The method of claim 7 wherein the desired field voltage is calculated utilizing a second-order difference equation and a microprocessor.

9. The method of claim 8 wherein the second-order difference equation is $v(k) = BN * v(k-1) + (1-BN) * v(k-2) + AN * [e(k) - KN * e(k-1)]$, wherein BN, AN and KN are said set of the coefficients, $v(k-1)$ and $v(k-2)$ are values of previously calculated field voltages, $e(k)$ is the value of said error signal and $e(k)$ is the value of a previously calculated error signal.

10. In a power supply system for a vehicle in which a battery and an electric load are electrically connected in parallel with an engine-driven alternator having field windings, the alternator providing an electrical output which is a function of the voltage across the field windings, a control system for controlling the alternator in response to a reference control signal and a load, wherein desired responses of the alternator to corresponding current demands are defined by a data matrix of system operating coefficients, the control system comprising:

means for generating an output signal based on the electrical output of the alternator;

means for generating an error signal based on the difference between the reference control signal and said output signal;

means for correlating the load demand signal with the data matrix to obtain a set of the coefficients as a function of the load demand signal, the coefficients having values based on the desired responses of the alternator; and means for calculating a desired field voltage based on said set of coefficients and said error signal for controlling the current flow through the field windings of the alternator based on system load current variations.

11. The control system of claim 10 further comprising means for generating a velocity signal based on an angular velocity of the alternator and means for modifying said set of coefficients based on said velocity signal.

12. The control system of claim 10 further comprising means for generating at least one feedback signal based on an electrical characteristic of the alternator.

13. The control system of claim 12 wherein said means for generating the at least one feedback signal includes a voltage sensor for sensing the voltage across the output of the alternator.

14. The control system of claim 12 or claim 13 wherein said means for generating the at least one feedback signal includes a current sensor for sensing the current output of the alternator.

15. The control system of claim 10 wherein the desired field voltage is calculated utilizing a difference equation.

16. The control system of claim 15 wherein the desired field voltage is calculated utilizing a second-order difference equation and a microprocessor.

17. The system of claim 16 wherein said second-order difference equation is $v(k) = BN * v(k-1) + (1-BN) * v(k-2) + AN * e(k) - KN * e(k-1)]$, wherein BN, AN and KN are said set of the coefficients, $v(k-1)$ and $v(k-2)$ are values of previously calculated field voltages, $e(k)$ is the value of said error signal and $e(k-1)$ is the value of a previously calculated error signal.

* * * * *

UNITED STATES PATENT AND TRADEMARK OFFICE
CERTIFICATE OF CORRECTION

PATENT NO. : 5,216,350
DATED : June 1, 1993
INVENTOR(S) : Alan F. Judge et al

It is certified that error appears in the above-indentified patent and that said Letters Patent is hereby corrected as shown below:

Column 1, line 66, before "is applied" insert --load--.

Column 2, line 5, before "control" delete "c" and substitute --charge--.

Column 2, line 33, before "between" insert --comparison--.

Column 3, line 22, after "obtain" insert --a--.

Column 3, line 30, before "the" insert --on--.

Column 7, line 46, Claim 10, after "load" insert --demand signal based on the current demand of the electric load,--.

Signed and Sealed this

Fifth Day of April, 1994

Attest:

BRUCE LEHMAN

Attesting Officer *Commissioner of Patents and Trademarks*